Patented Jan. 14, 1930

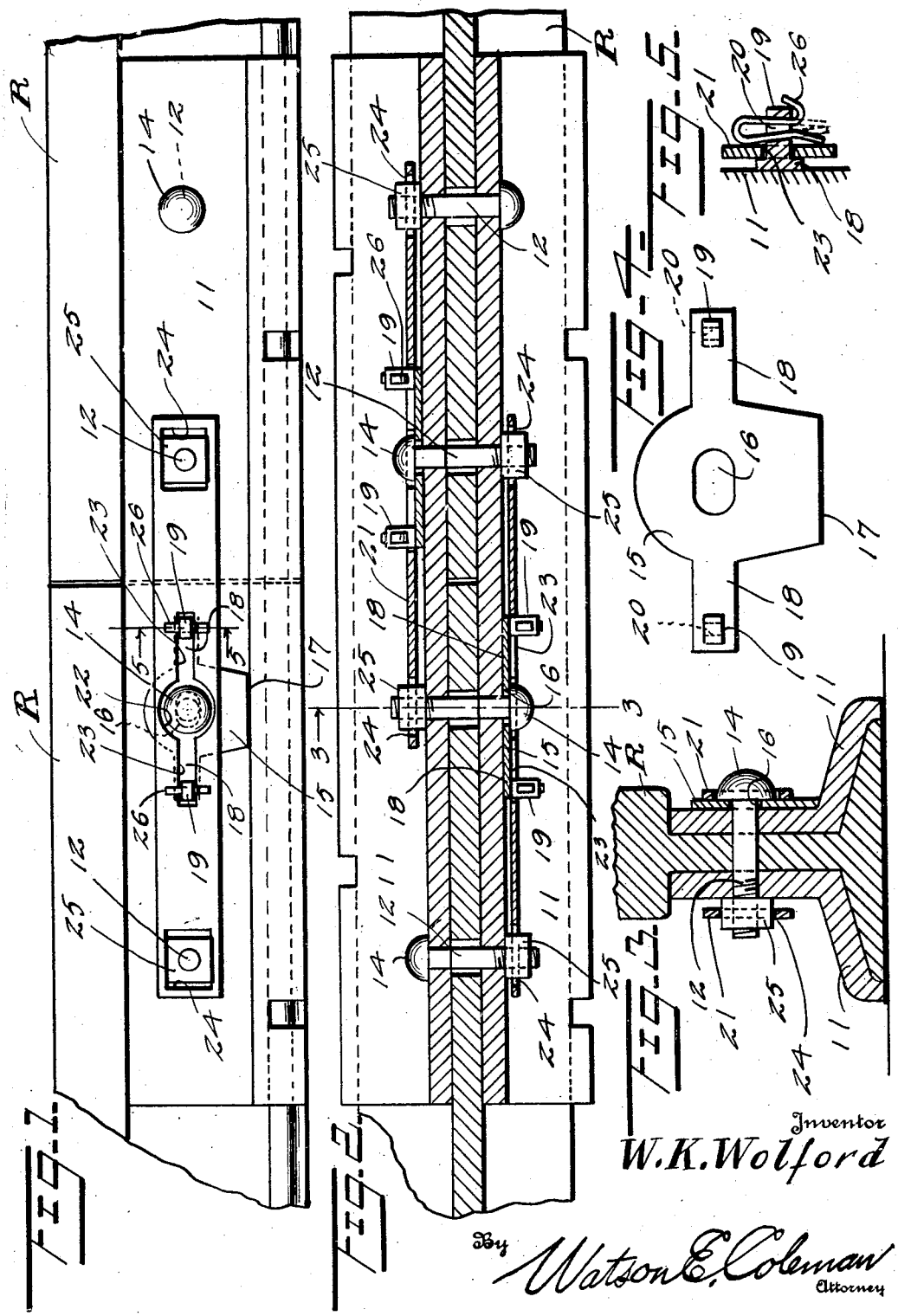

1,743,417

UNITED STATES PATENT OFFICE

WILLIAM K. WOLFORD, OF WELCOME, MINNESOTA

NUT LOCK FOR RAIL JOINTS

Application filed February 9, 1928. Serial No. 253,111.

This invention relates to nut locks for rail joints.

An important object of the invention is the provision of a device of this character which may be employed with the present type of angle bars used upon rail joints without in any manner altering the construction thereof and which will present few difficulties in the application beyond those ordinarily attending the application of the bolts to the joint.

A further object of the invention is to provide a device of this character which is simple in its construction and operation, may be cheaply produced and which will be a general improvement in the art.

These and other objects I attain by the construction shown in the accompanying drawing, wherein for the purpose of illustration is shown a preferred embodiment of my invention and wherein:—

Figure 1 is a side elevation of a rail joint constructed in accordance with my invention;

Figure 2 is a longitudinal sectional view therethrough;

Figure 3 is a section on the line 3—3 of Figure 2;

Figure 4 is a front elevation of the securing plate;

Figure 5 is a section on the line 5—5 of Figure 1.

Referring now more particularly to the drawing, the numeral 10 generally designates an ordinary rail joint which includes the usual angle plates 11 and bolts 12 directed through the angle plates and rails R to secure them in position. In accordance with my invention, these bolts which are usually four in number are alternately arranged with their heads at opposite sides of the joint. Beneath the heads 14 of the two center bolts, I place attaching plates 15, which have openings through which the bolt may pass, as indicated at 16, which are of sufficient size to allow for creeping of the rail under expansion but of such size that the heads of the bolts may not pass therethrough. This plate has one edge 17 adapted for engagement with the bottom flange of the angle bar, so that it will not rotate upon the bolt and has at its sides longitudinally extending arms 18, the ends of which are provided with outstanding ears 19 having vertical openings formed therein, as indicated at 20. After the attaching plates 15 are applied, all of the bolts are tightly drawn up and lock bars 21 placed in position. These lock bars have a central aperture 22 through which the head of the bolt may extend which has wings 23 through which the ears 19 may project. The ends of the bar have openings 24 receiving the nuts 25 of adjacent bolts 12 and having engagement therewith, preventing these nuts from rotating. The bar 21 is secured in position by means of cotter keys 26, the outer faces of the arms of which converge toward one another at their free ends, so that the keys are normally in the form of wedges. The walls of the openings 20 have the same taper as the walls of the keys, so that these keys may act to firmly wedge the bar in against the attaching plate and prevent any vibration or movement thereof. The keys, when inserted to their fullest extent, may be expanded after the manner of the ordinary cotter key to prevent their withdrawal.

It will be obvious that a device of this character may be applied to the rail joint without altering the present construction thereof beyond the possible necessity of providing slightly longer bolts for coaction with the attaching plates.

Since the construction hereinbefore set forth is capable of a certain range of change and modification without materially departing from the spirit of the invention, I do not limit myself to such specific structure except as hereinafter claimed.

I claim:—

The combination with a rail joint including the usual angle plates, rails and bolts directed therethrough, said bolts being arranged in pairs and each bolt of each pair being oppositely directed with respect to the other bolt, of an attaching plate having spaced apertured ears, said attaching plate having an extended lower body portion adapted to engage the outwardly extending lower portion of the angle plates whereby to hold the plate against turning movement, said attaching plate having a horizontally elongated opening substantially in the center thereof through which the bolt is directed, a locking bar having substantially rectangular openings adjacent the opposite ends thereof and having a central circular opening, said circular opening being adapted to loosely receive the head of an oppositely directed bolt and having horizontally extending slots for receiving the outwardly extending ears of said attaching plate, said rectangular openings being adapted to receive the nuts of bolts directed through the angle plates, and locking means engaging the apertured ears for holding the locking bar in position.

In testimony whereof I hereunto affix my signature.

WILLIAM K. WOLFORD.